United States Patent
Bay et al.

(10) Patent No.: US 6,319,631 B1
(45) Date of Patent: Nov. 20, 2001

(54) CONTACT SYSTEM FOR INTERCONNECTION OF SUBSTRATE AND BATTERY CELL

(75) Inventors: Laurence A. Bay, Lawrenceville; Steven L. Hassenzahl, Lilburn; Gary Wamboldt, Alpharetta, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/392,162

(22) Filed: Sep. 8, 1999

(51) Int. Cl.[7] .................................................... H01M 2/30
(52) U.S. Cl. ........................... 429/178; 439/500; 361/760
(58) Field of Search ........................... 439/500; 361/760; 429/178

(56) References Cited

U.S. PATENT DOCUMENTS 4,394,059 * 7/1983 Reynolds ........................ 429/178 X
5,421,745 * 6/1995 Aksoy et al. ..................... 439/500 X
5,607,795 * 3/1997 Saida ..................................... 429/100
5,796,588 * 8/1998 Machida et al. ................. 439/500 X

* cited by examiner

Primary Examiner—John S. Maples
(74) Attorney, Agent, or Firm—Philip H. Burrus, IV

(57) ABSTRACT

This invention is a U-shaped connector having horizontal flanges, the connector being used for attaching a substrate having an aperture to a battery cell. The connector is first soldered to a substrate with the horizontal flanges mating with the top of the substrate, while the U-shaped portion of the connector protrudes through the aperture in the substrate. The connector and substrate assembly can then be welded to a battery cell. In an alternate embodiment, service loops are added to the connector to give the substrate greater range of motion relative to the cell.

7 Claims, 5 Drawing Sheets

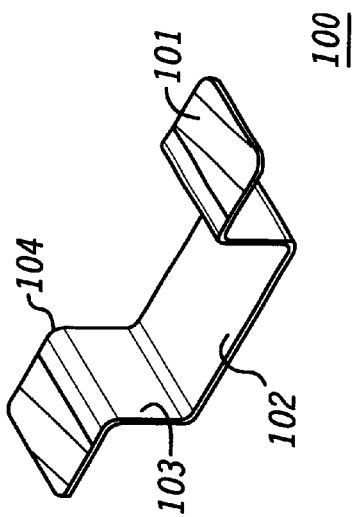
FIG. 1
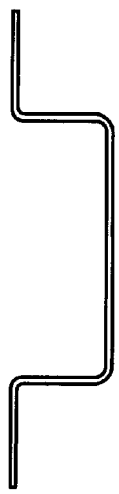
FIG. 2
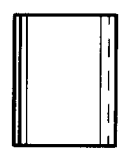
FIG. 3
FIG. 4
FIG. 5

CONTACT SYSTEM FOR INTERCONNECTION OF SUBSTRATE AND BATTERY CELL

TECHNICAL FIELD

This invention relates generally to electrical contacts. More specifically, this invention relates to electrical contacts battery cells.

BACKGROUND

More and more electronic devices are incorporating rechargeable batteries. Telephones, radios, laptop computers, compact disc players, video games, video recorders, personal organizers, power tools, and the like all require batteries for portability. The cost of replacing single use batteries, alkaline for instance, can be prohibitive. In an effort to save consumers money, electronics manufacturers are designing products which incorporate rechargeable batteries as opposed to single use cells. As rechargeable batteries can be charged and discharged thousands of times before replacement is needed, the overall cost of operating a rechargeable device becomes much cheaper.

Adding a rechargeable battery to a device, however, is not as simple as merely connecting a rechargeable cell to a circuit. Improper charging of rechargeable cells can be detrimental to battery performance. For example, a popular battery choice in rechargeable devices is the lithium-ion cell. When lithium cells are improperly charged or discharged, they can release gasses, causing damage to the cell. This condition of gaseous release, known as "venting", typically causes battery operation to cease.

To prevent venting from occurring, protection circuits, also called "safety circuits", are connected to rechargeable cells. Protection circuits often include a switch that opens when the battery temperature gets too hot. When the switch opens, no current can flow and venting is effectively stopped.

Such protection circuits are manufactured using resistors, capacitors, transistors and the like. They are mounted to either a rigid circuit board, often called a "PC Board", or to a flexible circuit board, sometimes called a "flex". The technical term for circuit boards and flexes is "substrate".

To make a complete rechargeable battery device, the safety circuit, along with its substrate, must be connected to the battery cell. In the past, this was done by soldering a wire onto the substrate and then soldering the opposite end of the wire to the battery cell. This is a tedious process which is labor intensive, slow, and expensive.

An alternative method of attaching substrates to cells is by using thin, flat pieces of flexible metal. These "tabs" can be soldered onto the substrate and then welded onto the board. The problem with tabs is that they must be soldered to the substrate and then bent around the cell for welding. This bending process often causes the tab to tear.

There is therefore a need for an improved method of attaching a substrate to a cell.

BRIEF DESCRIPTION OF THE DRAWINGS

FIG. 1 is an isometric view of a connector in accordance with the invention.

FIG. 2 is a top plan view of a connector in accordance with the invention.

FIG. 3 is a front elevated view of a connector in accordance with the invention.

FIG. 4 is a bottom plan view of a connector in accordance with the invention.

FIG. 5 is a right side elevated view of a connector in accordance with the invention.

DETAILED DESCRIPTION OF THE INVENTION

Figure 13:
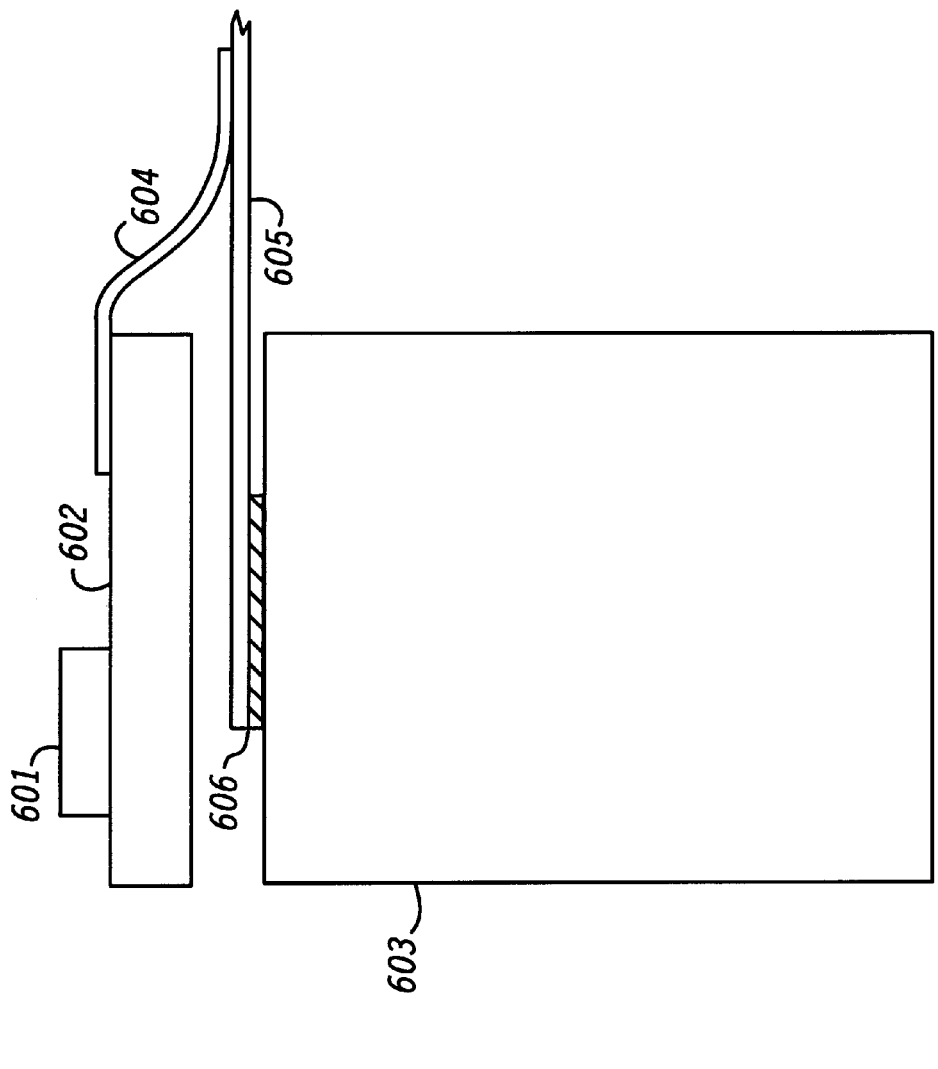
FIG. 13 is a prior art substrate to cell assembly.

Referring first to FIG. 13, illustrated therein is a traditional, prior art rechargeable battery assembly 600. The assembly 600 includes a battery cell 603 having a terminal 606, a substrate 602 having electrical components 601 mounted thereon, and two metal tabs 604, 605 for attaching the substrate 602 to the cell terminal 606.

As cost is generally a constraint in rechargeable battery manufacture, the substrate circuits associated with rechargeable batteries generally have metal on only one side. This being the case, the top of the substrate 602 must be connected to the battery terminal 606 which is located under the substrate 602. The substrate 602 can not be turned over, because the components 601 could then short to the cell 603. Thus, to attach the substrate 602 to the cell 603, two tabs 604 and 605 are required. The first tab 604 is soldered to the substrate 602. The second tab 605 is then welded to the cell 603 with a resistance weld. The first tab 604 is then welded to the second tab 605 with a pinch weld.

This prior art process is costly, as two tabs are required for connecting a substrate to a cell. Additionally, the process is labor intensive, which also adds cost. Another drawback is that the tabs are exposed on the edge of the battery and may potentially short to external metal.

The present invention is an improved connector and method for attaching a substrate to a battery cell. Referring now to FIG. 1, an embodiment of a connector 100 in accordance with the invention is therein illustrated. The connector 100 is U-shaped with a base 102 and vertical sides 103. The connector 100 has horizontal flanges 101 extending from the vertical sides 103 of the connector 100. The corners 104 have a small radius to prevent fatiguing of the metal. FIGS. 2–5 illustrate various views of the connector.

In a preferred embodiment, the connector is made from nickel, as it is relatively inexpensive, easy to weld and easy to solder. However, any number of conducting metals could be used to manufacture the connector including copper, steel, zinc, aluminum, tin, bronze, gold and titanium. Additionally, the connector can be formed by any number of known processes including hand forming, slide tools and progressive die.

Figure 6:
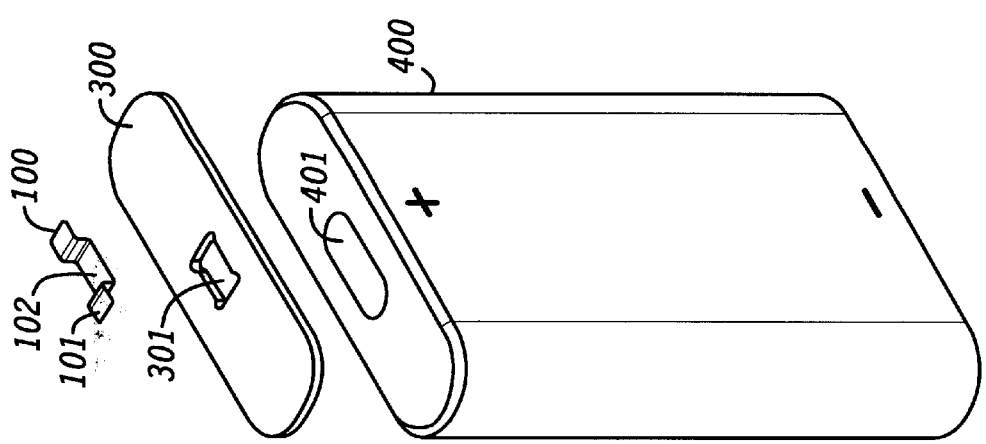
FIG. 6 is an isometric view of an alternate embodiment of a connector in accordance with the invention.

The connector is used to attach a substrate to a battery cell. Referring now to FIG. 6, illustrated therein is a connector 100 in accordance with the invention, along with a substrate 300 and a battery cell 400 in an exploded view. The substrate 300 contains an aperture 301 into which the connector is placed. The substrate 300 is generally a printed circuit board comprising electrical components, copper traces and pads. The components, traces and pads often form protection circuits for the battery cell 400. The substrate 300 can be either rigid or flexible. Rigid substrates can be made from a variety of materials, including FR4 circuit board material, plastic, and fiberglass. Flexible substrates are generally made from Kapton which encompasses copper traces.

In using the invention, the horizontal flanges 101 of the connector 300 are soldered to the top of the substrate. Once soldered, the bottom of the connector 102 protrudes through the substrate. The substrate 300 and connector 100 combination is then placed on the cell 400 such that the bottom of the connector 102 is physically touching the terminal 401 of the cell 400. The connector 100 is then welded to the terminal 401 of the cell. The welding process can be carried out using resistance welding, wherein the tip of the welding tool is placed on the bottom of the connector 102 through the aperture 301 in the substrate.

Figure 7:
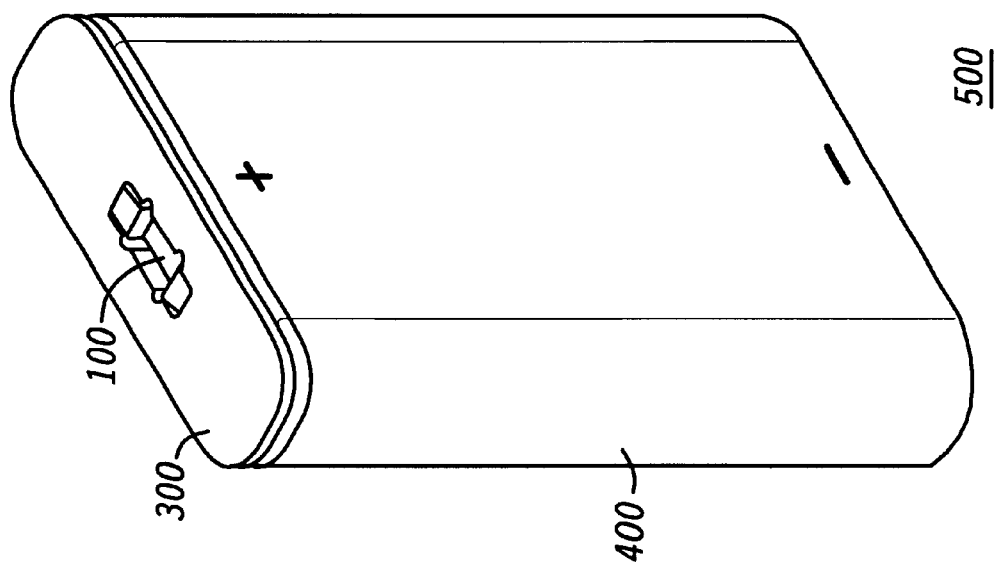
FIG. 7 is a top plan view of an alternate embodiment of a connector in accordance with the invention.

Referring now to FIG. 7, illustrated therein is a completed assembly 500 in accordance with the invention. Notice that the connector 100 has been soldered to the substrate 300, which has been welded to the cell 400. In this configuration, the flexible contact 100 allows the substrate 300 to move relative to the cell 400. This allowed motion prevents the weld from being broken when stress is applied to the substrate.

In some applications, a battery is subjected in extreme conditions. In such applications, the board may be required to move in a manner that is not afforded by the flexing of the connector. In other words, if a large force is placed upon the substrate, it will try to move relative to the cell. If the substrate moves more than the sides of the connector can bend, the connector can be excessively stressed.

Figure 8:
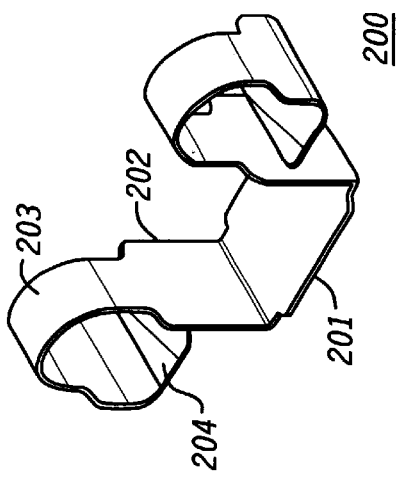
FIG. 8 is a front elevated view of an alternate embodiment of a connector in accordance with the invention.
Figure 12:
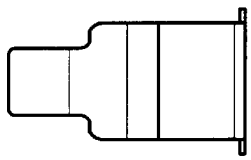
FIG. 12 is an isometric view of a connector attached to a substrate attached to a battery cell in accordance with the invention.
Figure 9:
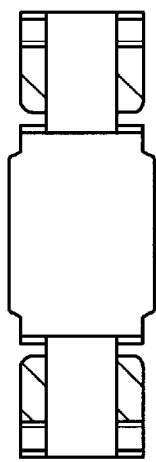
FIG. 9 is a bottom plan view of an alternate embodiment of a connector in accordance with the invention.
Figure 10:
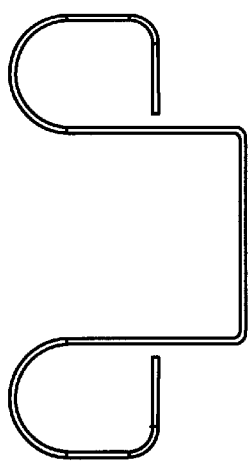
FIG. 10 is a right side elevated view of an alternate embodiment of a connector in accordance with the invention.
Figure 11:
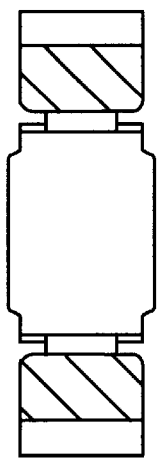
FIG. 11 is an exploded isometric view of a connector, a substrate and a battery cell in accordance with the invention.

An alternate embodiment of the invention alleviates abnormal stress in adverse conditions. Referring now to FIG. 8, illustrated therein is an alternate embodiment of the connector 200. The connector 200 is still U-shaped, however, instead of bends with a simple radius (104, FIG. 1) a service loop 203 has been added. The service loop 203 is a curvature of metal which begins at the vertical sides of the U 202 and ends at the horizontal flanges 204 which have been folded under in a gull wing fashion. When viewed from the front, this embodiment takes on the outline appearance of a ram's head. The service loops appear to be the ram's horns.

The service loop embodiment, when assembled with a substrate and cell as previously described, allows a greater range of motion of the substrate relative to the cell. This greater range of motion helps to both remove stress from the connector and prevent the resistance weld from breaking.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the connector has been used herein to attach a substrate to a battery cell, the connector could easily be used to connect a substrate to a heat sink.

What is claimed is:

1. A rechargeable battery, comprising:
   A) a U-shaped metal connector having a base, sides, and horizontal flanges;
   B) a substrate having a top and an aperture; and
   C) a battery cell having at least one terminal;
      wherein the substrate is connected to the at least one terminal of the cell by the connector, and wherein the connector is placed in the aperture of the substrate such that the sides of the connector protrude through the aperture, and the horizontal flanges of the connector contact the top of the substrate, further wherein the base of the connector contacts at least one terminal of the battery cell, wherein the connector is attached to the substrate by a method selected from the group consisting of soldering and welding.

2. The rechargeable battery of claim 1, wherein the connector is attached to at least one terminal by a method selected from the group consisting of soldering and welding.

3. A rechargeable battery, comprising:
   A) a U-shaped metal connector having a base, sides, and horizontal flanges;
   B) a substrate having a top and an aperture; and
   C) a battery cell having at least one terminal;
      wherein the substrate is connected to the at least one terminal of the cell by the connector, the connector further comprising a service loop disposed between the sides of the connector and the horizontal flanges.

4. The rechargeable battery of claim 3, wherein the connector is placed in the aperture of the substrate such that the sides of the connector protrude through the aperture, and the horizontal flanges of the connector contact the top of the substrate.

5. The rechargeable battery of claim 4, further wherein the base of the connector contacts at least one terminal of the battery cell.

6. The rechargeable battery of claim 5, wherein the connector is attached to the substrate by a method selected from the group consisting of soldering and welding.

7. The rechargeable battery of claim 6, wherein the connector is attached to at least one terminal by a method selected from the group consisting of soldering and welding.

* * * * *